US010415891B2

(12) United States Patent
Iwata et al.

(10) Patent No.: US 10,415,891 B2
(45) Date of Patent: Sep. 17, 2019

(54) HEAT EXCHANGER AND HEAT STORAGE SYSTEM

(71) Applicant: KABUSHIKI KAISHA TOYOTA CHUO KENKYUSHO, Nagakute-shi, Aichi-ken (JP)

(72) Inventors: Ryuichi Iwata, Nagakute (JP); Takafumi Yamauchi, Nagakute (JP); Yasuki Hirota, Nagakute (JP); Takashi Shimazu, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 258 days.

(21) Appl. No.: 15/424,389

(22) Filed: Feb. 3, 2017

(65) Prior Publication Data
US 2017/0241718 A1 Aug. 24, 2017

(30) Foreign Application Priority Data

Feb. 22, 2016 (JP) .................................. 2016-030833
Dec. 21, 2016 (JP) .................................. 2016-248095

(51) Int. Cl.
*B01D 53/22* (2006.01)
*F28D 20/00* (2006.01)
(Continued)

(52) U.S. Cl.
CPC ......... *F28D 20/003* (2013.01); *F28D 20/025* (2013.01); *F28D 21/0015* (2013.01);
(Continued)

(58) Field of Classification Search
CPC .. F28D 21/0015; F28D 20/003; F28D 20/025; Y02E 60/145; Y02E 60/142
See application file for complete search history.

(56) References Cited

U.S. PATENT DOCUMENTS 4,512,821 A * 4/1985 Staffin ...................... C21D 1/53
148/209
4,980,609 A * 12/1990 Thayer, III ................ H01T 2/00
313/231.01
(Continued)

FOREIGN PATENT DOCUMENTS

JP   H07-294057 A   11/1995
JP   H11-132593 A    5/1999
(Continued)

OTHER PUBLICATIONS

Feb. 19, 2019 Office Action issued in Japanese Patent Application No. 2016-248095.

*Primary Examiner* — Anthony R Shumate
(74) *Attorney, Agent, or Firm* — Oliff PLC (57) ABSTRACT

A heat exchanger comprising: a heat exchange unit that exchanges heat between a heat transfer medium and a heat exchange object; a phase change unit, which comprises a liquid phase space that accommodates the heat transfer medium in a liquid phase state, and a gas phase space that accommodates the heat transfer medium in a gas phase state, the heat transfer medium being capable of moving into and out of the gas phase space; and a first channel along which the heat transfer medium is moved from the phase change unit to the heat exchange unit, wherein the heat exchanger is configured such that a saturated vapor pressure at a temperature of the heat transfer medium in the liquid phase flowing into the phase change unit differs from a pressure of the heat transfer medium in the gas phase in the gas phase space.

9 Claims, 4 Drawing Sheets

(51) Int. Cl.
    *F28D 20/02*     (2006.01)
    *F28D 21/00*     (2006.01)

(52) U.S. Cl.
    CPC ..... *F28D 2020/0078* (2013.01); *Y02E 60/142* (2013.01); *Y02E 60/145* (2013.01)

(56) References Cited

U.S. PATENT DOCUMENTS

| | | | |
|---|---|---|---|
| 5,732,569 | A | 3/1998 | Sanada et al. |
| 6,237,356 | B1* | 5/2001 | Hori ............... F25B 25/005 |
| | | | 62/238.4 |
| 6,672,099 | B1 | 1/2004 | Yoshimi et al. |
| 2006/0144619 | A1* | 7/2006 | Storm, Jr. ......... E21B 47/011 |
| | | | 175/17 |
| 2009/0025406 | A1* | 1/2009 | Yoshimi ............ F25B 13/00 |
| | | | 62/127 |
| 2011/0036116 | A1* | 2/2011 | Lee ............... F24D 11/0242 |
| | | | 62/470 |
| 2011/0100009 | A1* | 5/2011 | Lehar ................ F01K 23/10 |
| | | | 60/651 |
| 2011/0144378 | A1* | 6/2011 | Zhang ................ B01D 3/009 |
| | | | 560/248 |
| 2012/0117816 | A1* | 5/2012 | Yokohama ............. C10L 9/08 |
| | | | 34/360 |
| 2015/0080202 | A1* | 3/2015 | Mueller ............. B04B 15/02 |
| | | | 494/7 |
| 2015/0345254 | A1* | 12/2015 | Ciglenec ........... E21B 47/011 |
| | | | 166/302 |

FOREIGN PATENT DOCUMENTS

| | | |
|---|---|---|
| JP | 2001-074322 A | 3/2001 |
| JP | 2009-228951 A | 10/2009 |
| JP | 2012-112602 A | 6/2012 |
| JP | 2015-232101 A | 12/2015 |

\* cited by examiner

HEAT EXCHANGER AND HEAT STORAGE SYSTEM

CROSS-REFERENCE TO RELATED APPLICATION

This application is based on and claims priority under 35 USC 119 from Japanese Patent Application No. 2016-030833 filed on Feb. 22, 2016 and Japanese Patent Application No. 2016-248095 filed on Dec. 21, 2016, the disclosure of which is incorporated by reference herein.

TECHNICAL FIELD

The present invention relates to a heat exchanger and a heat storage system.

BACKGROUND ART

Japanese Patent Application Laid-Open (JP-A) No. 2012-112602 recites an adsorption-type refrigerator that lowers the temperature of a heat transfer medium flowing through a channel by evaporating a refrigerant that has adsorbed to an outer surface of an evaporation portion.

In this adsorption-type refrigerator, the heat transfer medium whose temperature has been lowered (i.e., that has been cooled) flows into a heat exchanger and cools air in a compartment.

SUMMARY OF INVENTION

In the configuration recited in Japanese Patent Application Laid-Open (JP-A) No. 2012-112602, heat is exchanged between the refrigerant and the heat transfer medium by the evaporation of the refrigerant and, at the heat exchanger, heat is exchanged between the heat transfer medium whose temperature has been lowered and the air. Because the heat is exchanged twice, a heat exchange efficiency may be low. Moreover, this configuration may lead to an increase in complexity of the heat exchanger structure.

Objects of the present application are to raise heat exchange efficiency in a heat exchanger and a heat storage system, and to enable simplification of structures of the heat exchanger and heat storage system.

A first aspect is a heat exchanger that includes: a heat exchange unit that exchanges heat between a heat transfer medium and a heat exchange object; a phase change unit, which comprises a liquid phase space that accommodates the heat transfer medium in a liquid phase state, and a gas phase space that accommodates the heat transfer medium in a gas phase state, the heat transfer medium being capable of moving into and out of the gas phase space; and a first channel along which the heat transfer medium is moved from the phase change unit to the heat exchange unit, wherein the heat exchanger is configured such that a saturated vapor pressure at a temperature of the heat transfer medium in the liquid phase flowing into the phase change unit differs from a pressure of the heat transfer medium in the gas phase in the gas phase space.

In this heat exchanger, the liquid phase space and the gas phase space are formed in the phase change unit. When a portion of the heat transfer medium in the liquid phase that is accommodated in the liquid phase space gasifies, the temperature of the heat transfer medium in the liquid phase falls. Conversely, when a portion of the heat transfer medium in the gas phase that is accommodated in the gas phase space liquefies, the temperature of the heat transfer medium in the liquid phase rises.

The heat transfer medium whose temperature has been changed in the phase change unit in this manner is fed from the phase change unit to the heat exchange unit by the first channel. At the heat exchange unit, heat is exchanged between the heat transfer medium and the heat exchange object.

Thus, the heat transfer medium serves as both a medium that absorbs and releases latent heat by changing phase and a medium that exchanges heat with the heat exchange object. The heat exchange is substantially completed in a single cycle at the heat exchange unit. Therefore, both the heat exchange efficiency of the heat exchanger may be raised and the structure of the heat exchanger may be simplified.

In a second aspect, in the first aspect, the phase change unit includes a permeable membrane that separates the liquid phase space from the gas phase space and through which the heat transfer medium in the gas phase passes.

The phase change unit may be assuredly partitioned into the liquid phase space and the gas phase space by the permeable membrane. Because the gas phase and the liquid phase are separated in the phase change unit (gas-liquid separation), the heat transfer medium in the liquid phase may be fed efficiently. Because the heat transfer medium in the gas phase passes through the permeable membrane, the heat transfer medium in the gas phase has no effect on the phase change of the heat transfer medium in the phase change unit.

In a third aspect, in the second aspect, the permeable membrane includes a plurality of hollow fiber membranes that are formed in tubular shapes, insides of the hollow fiber membranes being the liquid phase space, and an outside of the hollow fiber membranes being the gas phase space.

Because the permeable membrane includes the plural hollow fiber membranes, the area of a gas-liquid boundary surface in the permeable membrane may be guaranteed to be large.

In a fourth aspect, in the second aspect or the third aspect, a pressure drop $\Delta P1$ of the heat transfer medium in the liquid phase passing through the permeable membrane and a pressure drop $\Delta P2$ of the heat transfer medium in the liquid phase passing through the liquid phase space satisfy a relationship of $\Delta P1 > \Delta P2$.

That is, the pressure drop $\Delta P2$ of the heat transfer medium in the liquid phase passing through the liquid phase space is smaller than the pressure drop $\Delta P1$ of the heat transfer medium in the liquid phase passing through the permeable membrane. Therefore, the heat transfer medium in the liquid phase may efficiently pass through the liquid phase space and be fed to the heat exchange unit.

A fifth aspect, in any one of the first to fourth aspects, further comprising a second channel that returns the heat transfer medium from the heat exchange unit to the phase change unit.

That is, the heat transfer medium is returned from the heat exchange unit to the phase change unit by the second channel. Therefore, the heat transfer medium may be circulated between the phase change unit and the heat exchange unit. Thus, the heat transfer medium may be utilized efficiently.

A sixth aspect, in any one of the first to fifth aspects, further comprising a heat transfer medium drainage portion at which the heat transfer medium is drained.

An excess in the quantity of heat transfer medium in the heat exchange unit may be suppressed by, for example, draining the heat transfer medium through the heat transfer medium drainage portion.

A seventh aspect, in any one of the first to sixth aspects, further comprising a heat transfer medium supply portion that supplies the heat transfer medium.

Even if, for example, the heat transfer medium is drained out of the phase change unit, an insufficiency of the amount of heat transfer medium in the heat exchange unit may be suppressed by the heat transfer medium being supplied from the heat transfer medium supply portion.

In an eighth aspect, in any one of the first to seventh aspects, the heat exchange by the heat exchange unit is an exchange of sensible heat.

Because there is no phase change of the heat transfer medium in association with the heat exchange between the heat transfer medium and the heat exchange object, the structure of the heat exchanger may be simplified.

A ninth aspect, in any one of the first to eighth aspects, further comprising a reactor that is connected to the gas phase space and in which the heat transfer medium in the gas phase is adsorbed or desorbed.

Even if, for example, the heat transfer medium has a low vapor pressure when the heat transfer medium is gasifying in the phase change unit, given the structure in which the heat transfer medium is adsorbed in the reactor, the heat transfer medium may be gasified efficiently.

When the heat transfer medium is being liquefied in the phase change unit, given the structure in which the heat transfer medium is desorbed in the reactor, the heat transfer medium may be liquefied efficiently. Moreover, a volume required for the phase change unit is small.

A tenth aspect is a heat storage system that includes: a heat exchanger according to any one of the first to ninth aspects; and a heat accumulator that is connected to the gas phase space, reacts the heat transfer medium in the gas phase with a heat accumulation material, and stores heat.

Because this heat storage system includes the heat exchanger according to the first aspect, heat may be accumulated in the heat accumulator by the heat transfer medium in the gas phase being reacted with the heat accumulation material of the heat accumulator. Hence, this heat may be supplied to other members.

The present invention may raise heat exchange efficiency and may enable a simplification of structure.

DESCRIPTION OF EMBODIMENTS

Figure 1:
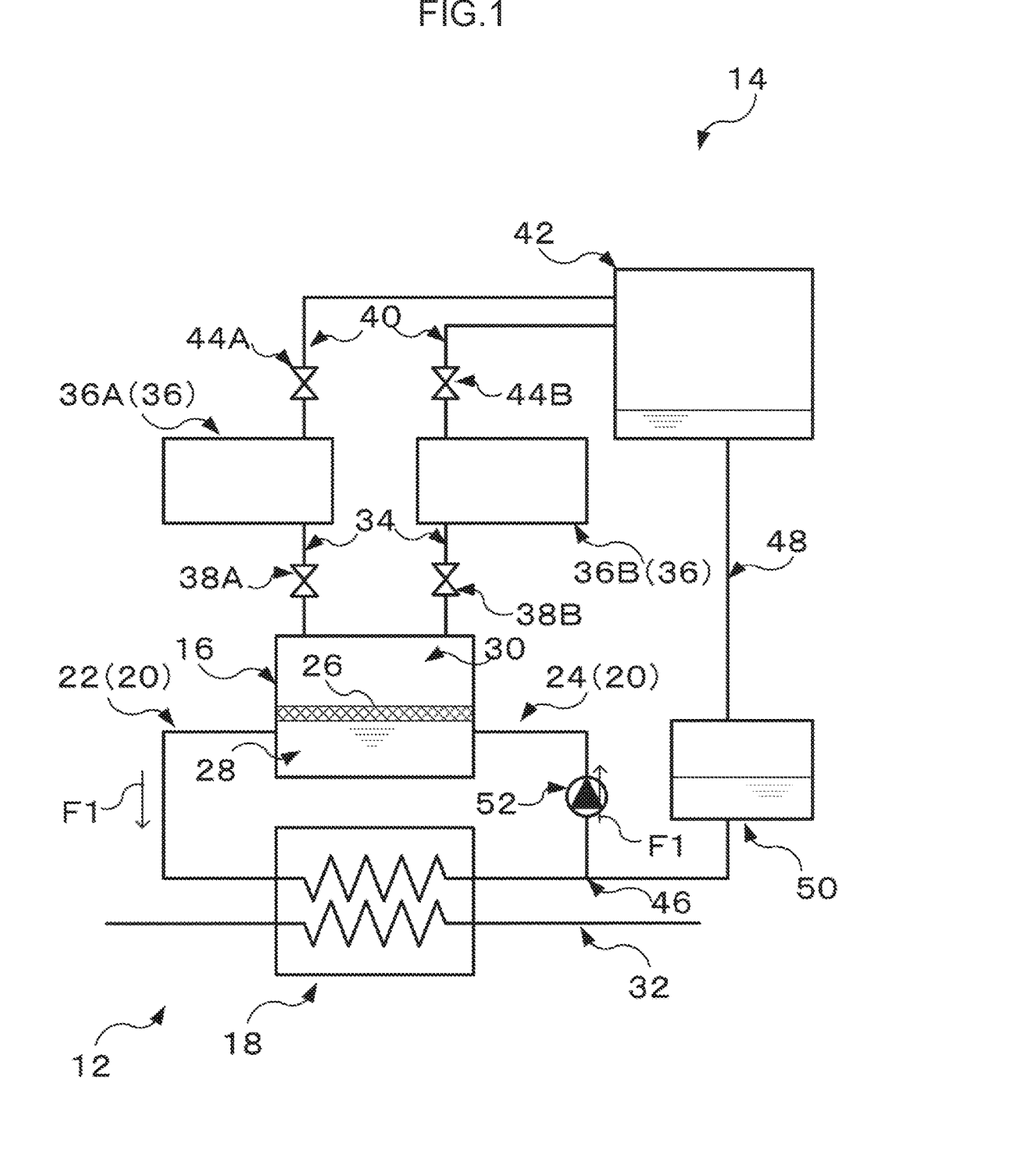
FIG. 1 is a structural diagram showing a heat exchanger (a heat storage system) according to a first exemplary embodiment.

FIG. 1 shows a heat exchanger 12 according to a first exemplary embodiment and a heat storage system 14 that is equipped with the heat exchanger 12. The heat exchanger 12 includes a phase change unit 16 and a sensible heat exchange unit 18. The phase change unit 16 and the sensible heat exchange unit 18 are connected by a first channel 22 and a second channel 24, with liquid-tight connections. A heat transfer medium in a liquid phase flows from the phase change unit 16 to the sensible heat exchange unit 18 through the first channel 22, and the liquid phase heat transfer medium flows from the sensible heat exchange unit 18 to the phase change unit 16 through the second channel 24. In other words, a circulation channel 20 through which the heat transfer medium is circulated between the phase change unit 16 and the sensible heat exchange unit 18 is formed by the first channel 22 and the second channel 24.

The phase change unit 16 is a container-shaped member whose interior is hollow. The interior of the phase change unit 16 is partitioned by a permeable membrane 26, which extends in the horizontal directions, into a gas phase space 30 at the upper side and a liquid phase space 28 at the lower side. The first channel 22 and the second channel 24 are connected to wall faces of the liquid phase space of the phase change unit 16. The heat transfer medium (in the liquid phase) in the liquid phase space 28 flows out through the first channel 22, and the heat transfer medium (in the liquid phase) flows into the liquid phase space 28 from the second channel 24.

In the present exemplary embodiment, as described bellow, the heat transfer medium in the liquid phase space 28 of the phase change unit 16 is in a liquid phase state. The heat transfer medium is a medium of which a portion evaporates into the gas phase space 30 (gasifies) under particular conditions (of pressure and temperature). That is, there is a pressure difference between the liquid phase heat transfer medium flowing into the liquid phase space 28 of the phase change unit 16 and the heat transfer medium in the gas phase that is in the gas phase space 30. There are states in which the pressure of the gas phase heat transfer medium (a gas phase pressure represented by X2) is lower than a saturated vapor pressure X1 of the heat transfer medium at a liquid phase temperature of the heat transfer medium, and states in which the gas phase pressure X2 is higher than the saturated vapor pressure X1.

In a state in which the saturated vapor pressure X1 is higher than the gas phase pressure X2, a portion of the liquid phase heat transfer medium gasifies and the temperature of the liquid phase heat transfer medium is lowered by the heat of vaporization. On the other hand, when the gas phase pressure X2 rises a little from a state in which the gas phase pressure X2 is equal to the saturated vapor pressure X1, a portion of the gas phase heat transfer medium liquefies and the temperature of the liquid phase heat transfer medium is raised by the heat of condensation.

Provided these conditions are satisfied, the type of heat transfer medium is not particularly limited in composition. For example, water may be mentioned as a single-component heat transfer medium, and an aqueous ethanol solution may be mentioned as a two-component heat transfer medium.

The permeable membrane 26 is a film-shaped member with microscopic pores that allow the heat transfer medium in the gas phase (heat transfer medium molecules) to pass through. Thus, the liquid phase space 28 at the lower side relative to the permeable membrane 26 and the gas phase space 30 at the upper side may be separated and portions of the liquid phase heat transfer medium may be gasified efficiently.

A second heat transfer medium channel 32, through which a second heat transfer medium flows, is connected to the sensible heat exchange unit 18. In the sensible heat exchange unit 18, sensible heat is exchanged between the heat transfer medium flowing through the circulation channel 20 and the second heat transfer medium flowing through the second heat transfer medium channel 32.

The heat storage system 14 includes adsorbers 36. The adsorbers 36 are connected to the gas phase space 30 of the phase change unit 16 via connection channels 34. In the present exemplary embodiment, a plural number (two) of adsorbers 36A and 36B are connected to the gas phase space 30 in parallel. The adsorbers 36 as a whole may operate continuously by switching to alternate between the adsorbers 36A and 36B. Herebelow, where the adsorbers 36A and 36B are not to be distinguished, they are referred to as the adsorbers 36.

On-off valves 38A and 38B are provided on the connection channels 34. In open states of the on-off valves 38A and 38B, movements of the heat transfer medium (in the gas phase) between the gas phase space 30 of the phase change unit 16 and the adsorbers 36 are enabled. In closed states of the on-off valves 38A and 38B, movements of the heat transfer medium between the gas phase space 30 of the phase change unit 16 and the adsorbers 36 are blocked.

An adsorbing material is accommodated in the adsorbers 36. The adsorbing material operates to adsorb the gas phase heat transfer medium. When particular conditions arise, the adsorbing material operates to desorb the heat transfer medium that has been adsorbed. The adsorbers 36 operate to release heat and store heat therein by adsorbing the gas phase heat transfer medium. That is, in the present exemplary embodiment the adsorbers 36 function as a heat accumulator.

A condenser 42 is connected to each of the adsorbers 36 via connection channels 40. In the present exemplary embodiment, the single condenser 42 is provided in common for the two adsorbers 36A and 36B.

On-off valves 44A and 44B are provided on the connection channels 40. In open states of the on-off valves 44A and 44B, movements of the heat transfer medium between the corresponding adsorbers 36A and 36B and the condenser 42 are enabled. In closed states of the on-off valves 44A and 44B, movements of the heat transfer medium between the corresponding adsorbers 36A and 36B and the condenser 42 are blocked. Within the condenser 42, energy is extracted from the gas phase heat transfer medium flowing in from the adsorbers 36. Thus, the heat transfer medium is condensed (liquefied).

The condenser 42 is connected with an intermediate portion (a connection portion 46) of the second channel 24 by a return channel 48. A heat transfer medium container 50 is provided partway along the return channel 48. The liquid phase heat transfer medium that has been condensed in the condenser 42 is temporarily stored in the heat transfer medium container 50. The heat transfer medium that has been stored in the heat transfer medium container 50 is returned to the second channel 24.

A pump 52 is provided on the second channel 24 at a location between the connection portion 46 and the phase change unit 16. The liquid phase heat transfer medium may be caused to flow (pumped) in the circulation channel 20 in the direction of arrow F1 by driving of the pump 52. Thus, the heat transfer medium is circulated in the circulation channel 20 between the phase change unit 16 and the sensible heat exchange unit 18.

In the present exemplary embodiment, a relationship $\Delta P1 > \Delta P2$ is established between a pressure drop $\Delta P2$ when the refrigerant passes through the liquid phase space 28 of the phase change unit 16 and a pressure drop $\Delta P1$ when the liquid phase heat transfer medium passes through the permeable membrane 26.

Now, operation of the present exemplary embodiment is described.

The liquid phase heat transfer medium is circulated through the circulation channel 20 in the direction of arrow F1 by driving of the pump 52. Thus, the heat transfer medium is fed to the liquid phase space 28 of the phase change unit 16.

In a state in which one or the other of the two on-off valves 38A and 38B is open, the gas phase heat transfer medium is adsorbed by the corresponding adsorber 36. Thus, a reduction in pressure in the gas phase space 30 of the phase change unit 16 may be produced. In the phase change unit 16, the heat transfer medium (in the liquid phase) in the liquid phase space gasifies, passes through the permeable membrane 26, and reaches the gas phase space 30. The heat transfer medium moves through the connection channel 34 to the adsorber 36 and is adsorbed. When the gas phase heat transfer medium is adsorbed in the adsorber 36, heat is released and heat is stored.

In the phase change unit 16, the heat transfer medium (in the liquid phase) in the liquid phase space 28 is cooled (lowered in temperature) by the latent heat of the heat transfer medium gasifying. Because the heat transfer medium (in the liquid phase) in the liquid phase space 28 does not pass through the permeable membrane 26, the state in which the heat transfer medium remains in the liquid phase in the liquid phase space 28 is maintained.

The liquid phase heat transfer medium that has been cooled in the liquid phase space 28 moves through the first channel 22 to the sensible heat exchange unit 18. In the sensible heat exchange unit 18, sensible heat is exchanged between the heat transfer medium flowing through the circulation channel 20 and the second heat transfer medium flowing through the second heat transfer medium channel 32. That is, the second heat transfer medium may be cooled by the heat transfer medium that has been cooled.

Conversely, when the heat transfer medium that has been adsorbed in the adsorber 36 is desorbed and fed to the gas phase space 30 of the phase change unit 16, the heat transfer medium (in the gas phase) in the gas phase space 30 may be condensed. The heat transfer medium passes through the permeable membrane 26 and liquefies in the liquid phase space 28. Thus, the heat transfer medium (in the liquid phase) in the liquid phase space 28 is heated. Hence, by the heat transfer medium that has been heated being fed to the sensible heat exchange unit 18, the second heat transfer medium may be heated in the sensible heat exchange unit 18.

As can be understood from the above descriptions, in the heat exchanger 12 according to the present exemplary embodiment, the medium that undergoes phase changes and the material that exchanges heat produced by the phase changes (cooling or heating) with the second heat transfer medium, which is the heat exchange object, are the same, being the heat transfer medium. In the heat exchanger 12 according to the present exemplary embodiment, the heat exchange is substantially completed in a single cycle between the heat transfer medium and the second heat transfer medium. Therefore, the efficiency of heat exchange is higher than in a structure that performs plural heat exchanges.

Now, as a comparative example, a structure is assumed in which a heat transfer medium exchanges heat with another phase change medium. In the structure according to the comparative example, for example, the phase change medium may be gasified and the heat transfer medium cooled by the latent heat of gasification.

However, in the structure according to the comparative example, vapor produced by the gasification of the phase change medium must be fed to an adsorber or the like. If a vapor pressure of the phase change medium is low, it is necessary to dispose an evaporator and the adsorber close together, restricting arrangements of these units. By contrast, the heat exchanger 12 according to the present exemplary embodiment as described above is a structure in which the heat transfer medium that undergoes phase changes is itself cooled or heated. Thus, there is no need to move the phase change medium, the phase change unit 16 and the adsorbers 36 may be disposed apart from one another, and there is greater freedom of arrangement.

In the heat exchanger 12 according to the first exemplary embodiment, the liquid phase space 28 and the gas phase space 30 are separated by the permeable membrane 26 provided in the phase change unit 16. That is, the interior of the phase change unit 16 may have substantial gas-liquid separation due to the permeable membrane 26. Therefore, the liquid phase heat transfer medium may be efficiently pumped by driving of the pump 52, contributing to efficient sensible heat exchange at the sensible heat exchange unit 18.

The pressure drop ΔP2 when the refrigerant passes through the liquid phase space 28 of the phase change unit 16 and the pressure drop ΔP1 when the liquid phase heat transfer medium passes through the permeable membrane 26 have the relationship ΔP1>ΔP2. Therefore, unintended movement of the heat transfer medium cooled in the liquid phase space 28 to the gas phase space 30 may be suppressed, and the heat transfer medium may be efficiently pumped to the sensible heat exchange unit 18.

Now, a second exemplary embodiment is described. Elements, members and the like of the second exemplary embodiment that are the same as in the first exemplary embodiment are assigned the same reference numerals and are not described in detail.

Figure 2:
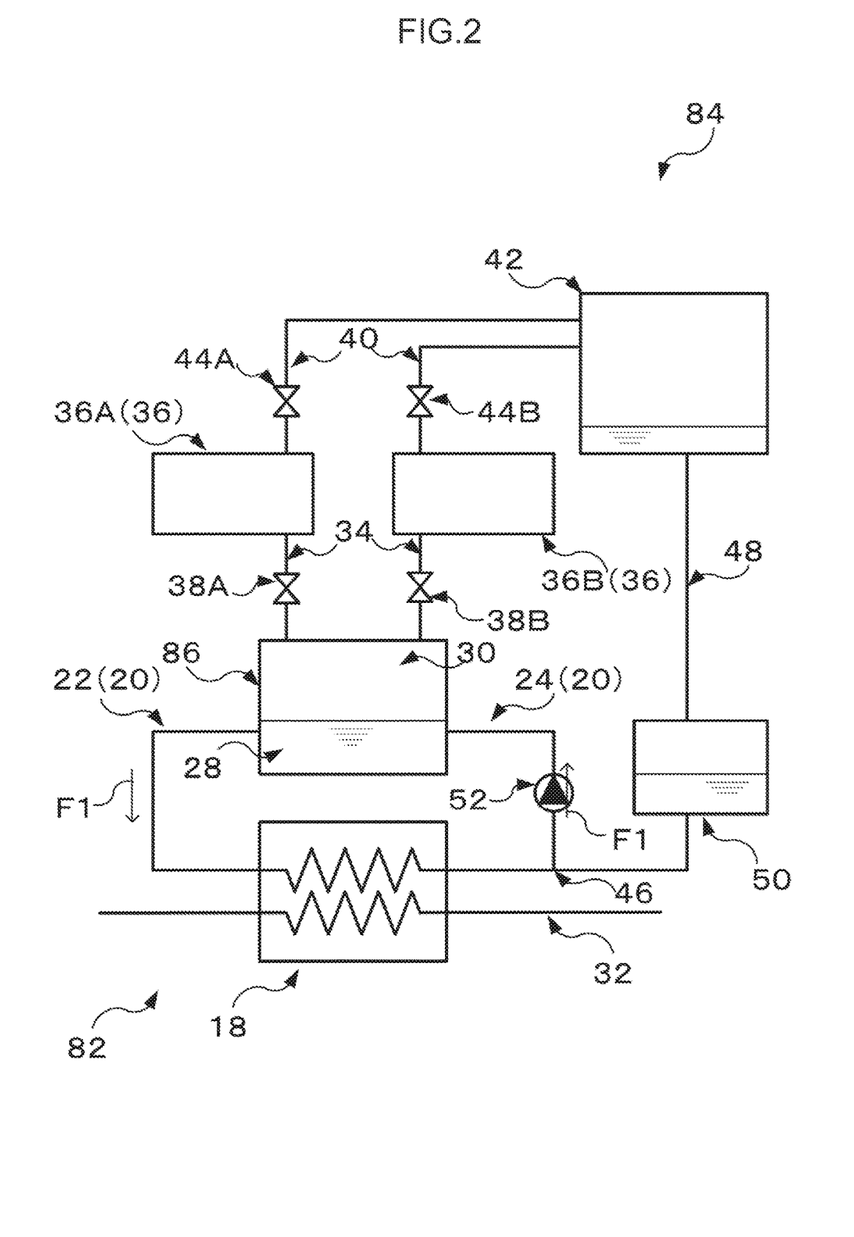
FIG. 2 is a structural diagram showing a heat exchanger (a heat storage system) according to a second exemplary embodiment.

As shown in FIG. 2, a heat exchanger 82 and heat storage system 84 according to the second exemplary embodiment include a phase change unit 86, inside which the liquid phase space 28 and the gas phase space 30 are formed. The permeable membrane 26 according to the first exemplary embodiment (see FIG. 1) is not provided inside the phase change unit 86.

In the heat exchanger 82 according to the second exemplary embodiment that is structured thus, the heat transfer medium (in the liquid phase) may be cooled by the heat transfer medium in the liquid phase space 28 of the phase change unit 16 being gasified. Alternatively, the heat transfer medium (in the liquid phase) may be heated by the heat transfer medium in the gas phase space 30 being condensed.

The liquid phase heat transfer medium that has been cooled or heated in the liquid phase space 28 moves through the first channel 22 to the sensible heat exchange unit 18. In the sensible heat exchange unit 18, sensible heat is exchanged between the heat transfer medium flowing through the circulation channel 20 and the second heat transfer medium flowing through the second heat transfer medium channel 32. Thus, in the heat exchanger 82, because the heat exchange is substantially completed in one cycle, the heat exchange efficiency is high.

Now, a third exemplary embodiment is described. Elements, members and the like of the third exemplary embodiment that are the same as in the first exemplary embodiment are assigned the same reference numerals and are not described in detail.

Figure 3:
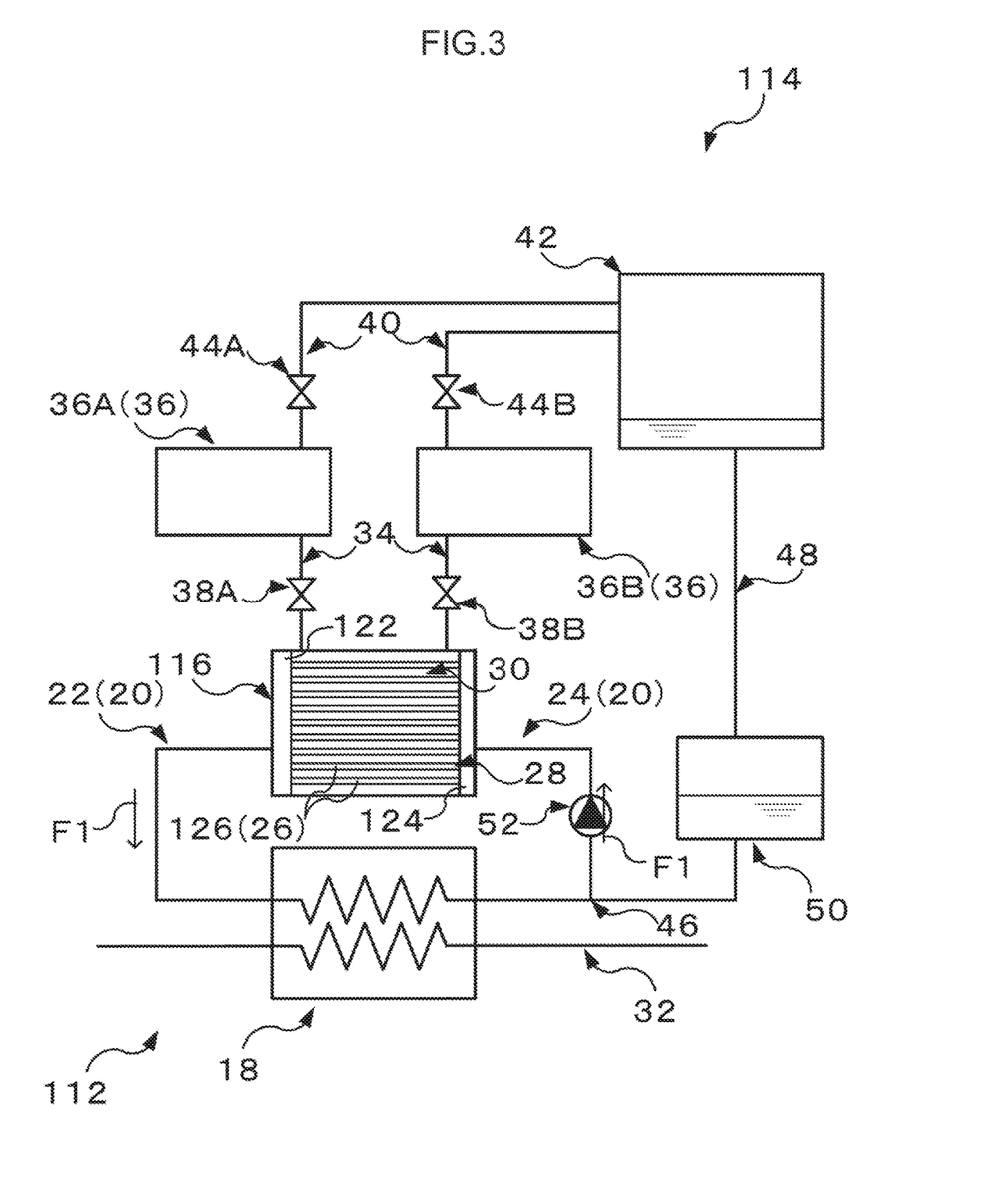
FIG. 3 is a structural diagram showing a heat exchanger (a heat storage system) according to a third exemplary embodiment.

As shown in FIG. 3, in a heat exchanger 112 and heat storage system 114 according to the third exemplary embodiment, a phase change unit 116 is equipped with plural hollow fiber membranes 126. The hollow fiber membranes 126 are an example of the permeable membrane.

Figure 4:
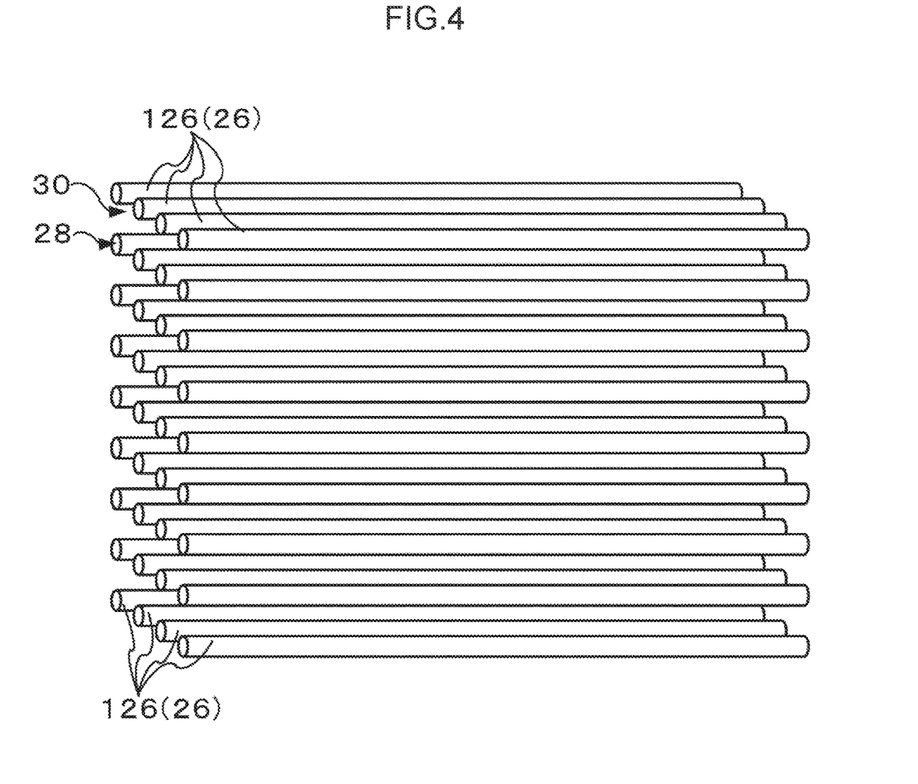
FIG. 4 is a perspective view showing hollow fiber membranes of the heat exchanger (heat storage system) according to the third exemplary embodiment.

As shown in more detail in FIG. 4, each of the hollow fiber membranes 126 is formed in a tubular shape. The insides of the hollow fiber membranes 126 serve as the liquid phase space 28 and the outside of the hollow fiber membranes 126 serves as the gas phase space 30.

Each of the hollow fiber membranes 126 includes numerous microscopic through-holes that communicate between the inside (the liquid phase space 28) and the outside (the gas phase space 30). In a state in which the outside of the respective hollow fiber membranes 126 is not at a lower pressure than the insides, these through-holes do not allow the liquid phase heat transfer medium flowing through the insides of the hollow fiber membranes 126 to permeate through (or permeation amounts are small). On the other hand, the through-holes are formed with predetermined opening cross-section areas (hole diameters) such that, when the outside of the hollow fiber membranes 126 is at a lower pressure than the insides, the heat transfer medium flowing through the insides permeates through the through-holes and the heat transfer medium gasifies outside the hollow fiber membranes 126. In a state in which the outside of the respective hollow fiber membranes 126 is not at a higher pressure than the insides, the through-holes do not allow the gas phase heat transfer medium at the outside to permeate through the through-holes (or permeation amounts are small). On the other hand, when the outside of the hollow fiber membranes 126 is at a higher pressure than the insides, the heat transfer medium at the outside permeates through the through-holes and liquefies inside the hollow fiber membranes 126.

The phase change unit 116 includes an inlet side manifold 124 that is connected to the second channel 24 and an outlet side manifold 122 that is connected to the first channel 22. The hollow fiber membranes 126 are arranged between the inlet side manifold 124 and the outlet side manifold 122. The liquid phase heat transfer medium flowing into the phase change unit 116 from the second channel 24 is divided to flow into the interiors of the plural hollow fiber membranes 126 by the inlet side manifold 124. The liquid phase heat transfer medium flowing through the interiors of the plural hollow fiber membranes 126 flows together in the outlet side manifold 122 and flows out into the first channel 22.

In the heat exchanger 112 according to the third exemplary embodiment with this structure, the heat transfer medium (in the liquid phase) may be cooled by the heat transfer medium in the liquid phase space 28 (inside the hollow fiber membranes 126) of the phase change unit 116 gasifying. Alternatively, the heat transfer medium (in the liquid phase) may be heated by the heat transfer medium in the gas phase space 30 (outside the hollow fiber membranes 126) condensing.

The liquid phase heat transfer medium that has been cooled or heated in the liquid phase space 28 moves through the first channel 22 to the sensible heat exchange unit 18. In the sensible heat exchange unit 18, sensible heat is exchanged between the heat transfer medium flowing through the circulation channel 20 and the second heat transfer medium flowing through the second heat transfer medium channel 32. Thus, in the heat exchanger 112, because the heat exchange is substantially completed in one cycle, the heat exchange efficiency is high.

In the third exemplary embodiment, because the hollow fiber membranes 126 are employed as the example of the permeable membrane, the surface area per unit volume of the heat transfer medium is larger than in, for example, the first exemplary embodiment. Because a gas-liquid boundary surface of the heat transfer medium is larger, an area over which the heat transfer medium changes phase between the liquid phase and the gas phase is larger. Consequently, the heat transfer medium may be cooled and heated efficiently.

In the exemplary embodiments described above, the heat exchanger 12, 82 or 112 includes the second channel 24 that returns the heat transfer medium from the sensible heat exchange unit 18 to the phase change unit 16, 86 or 116. Therefore, the heat transfer medium that is used for sensible heat exchange in the sensible heat exchange unit 18 may be returned to the phase change unit 16, 86 or 116 and re-used.

The adsorbers 36 are connected to the phase change unit 16, 86 or 116 of the heat exchanger 12, 82 or 112. Pressure in the gas phase space 30 of the phase change unit 16, 86 or 116 may be lowered by the heat transfer medium (in the gas phase) being adsorbed by the adsorbers 36. At this time, the adsorbers 36 are being used as a heat transfer medium drainage portion. That is, gasification of the heat transfer medium in the phase change unit 16, 86 or 116 may be promoted by draining the heat transfer medium from the gas phase space 30.

Conversely, when the heat transfer medium is supplied from the adsorbers 36 to the phase change unit 16, 86 or 116, the pressure in the gas phase space 30 of the phase change unit 16, 86 or 116 may be raised. At this time, the adsorbers 36 are being used as a heat transfer medium supply portion. That is, liquification of the heat transfer medium in the phase change unit 16, 86 or 116 may be promoted by the heat transfer medium being supplied to the gas phase space 30.

Structures other than the adsorbers 36 may be used to lower the pressure in the gas phase space 30 of the phase change unit 16, 86 or 116. For example, a structure is possible in which pressure in the gas phase space 30 is lowered by a pump. In a structure in which the adsorbers 36 are used, pressure in the gas phase space 30 may be lowered using smaller amounts of energy than in a structure in which a pump is used. The adsorbers 36 serve as a reactor that absorbs and desorbs the gas phase heat transfer medium. That is, a structure using the adsorbers 36 is a structure that may effectively utilize adsorption and desorption of the heat transfer medium to cause gasification and liquification of the heat transfer medium in the gas phase space 30.

The adsorbers 36 serve as the heat transfer medium drainage portion that drains the heat transfer medium from the phase change unit 16, 86 or 116 and as the heat transfer medium supply portion that supplies the heat transfer medium to the phase change unit 16, 86 or 116. Thus, by draining the heat transfer medium from the phase change unit 16, 86 or 116 or supplying the heat transfer medium to the phase change unit 16, 86 or 116, amounts of the heat transfer medium in the sensible heat exchange unit 18 may be adjusted as appropriate, and an excess or insufficiency in the amount of the heat transfer medium may be suppressed.

In the heat exchanger 12, 82 or 112 according to the exemplary embodiments described above, the heat transfer medium adsorbed in the adsorbers 36 may be condensed (liquefied) in the condenser 42 and returned to the phase change unit 16, 86 or 116 by the return channel 48. Because the heat transfer medium may be circulated and used repeatedly, phase changes of the heat transfer medium in the phase change unit 16, 86 or 116 may be caused efficiently.

A structure may be employed in which the adsorbers 36 accommodate a heat accumulation material thereinside and heat is released by adsorption of the heat transfer medium to the heat accumulation material. At this time, the adsorbers 36 are acting as a heat accumulator that stores generated heat. Hence, heat in the adsorbers 36 (the heat accumulator) may be applied to other members. A molded body of calcium oxide (CaO) may be mentioned as an example of the heat accumulation material. For example, it is possible to mix a binder such as a clay mineral or the like with a powder of calcium oxide, bake the mixture, and mold the product into tubular bodies so as to fit inside containers of the adsorbers 36. The heat accumulation material emits (releases) heat in association with hydration, and stores (absorbs) heat in association with dehydration. Thus, this structure may reversibly and repeatedly release heat and store heat in accordance with the chemical reactions shown below.

In these chemical reaction formulae, heat release amounts and heat storage amounts are represented by Q.

$$CaO + H_2O \rightarrow Ca(OH)_2 + Q \qquad \text{Formula 1:}$$

$$Ca(OH)_2 + Q \rightarrow CaO + H_2O \qquad \text{Formula 2:}$$

Formula 1 represents a chemical reaction that releases heat corresponding to a heat release amount Q when the heat accumulation material is hydrated, and Formula 2 represents a chemical reaction that stores heat corresponding to a heat storage amount Q when the calcium oxide is dehydrated. A heat storage amount per unit mass of the heat storage material in the present exemplary embodiments is, for example, 1.86 MJ/kg.

What is claimed is:

1. A heat exchange system comprising:
   a heat exchanger that exchanges heat between a heat transfer medium and a heat exchange object;
   a phase change unit, which comprises:
      a liquid phase space that accommodates the heat transfer medium in a liquid phase state, and
      a gas phase space that accommodates the heat transfer medium in a gas phase state, the heat transfer medium being capable of moving into and out of the gas phase space; and
   a first channel along which the heat transfer medium is moved from the phase change unit to the heat exchanger,
   wherein the heat exchange system is configured such that a saturated vapor pressure at a temperature of the heat transfer medium in the liquid phase flowing into the phase change unit differs from a pressure of the heat transfer medium in the gas phase in the gas phase space, and
   the phase change unit includes a permeable membrane that separates the liquid phase space from the gas phase space and through which the heat transfer medium in the gas phase passes.

2. The heat exchange system according to claim 1, wherein the permeable membrane includes a plurality of hollow fiber membranes that are formed in tubular shapes, insides of the hollow fiber membranes being the liquid phase space, and an outside of the hollow fiber membranes being the gas phase space.

3. The heat exchange system according to claim 1, wherein a pressure drop ΔP1 of the heat transfer medium in the liquid phase passing through the permeable membrane and a pressure drop ΔP2 of the heat transfer medium in the liquid phase passing through the liquid phase space satisfy a relationship of ΔP1>ΔP2.

4. The heat exchange system according to claim 1, further comprising a second channel that returns the heat transfer medium from the heat exchanger to the phase change unit.

5. The heat exchange system according to claim 1, further comprising a heat transfer medium drainage portion at which the heat transfer medium is drained.

6. The heat exchange system according to claim 1, further comprising a heat transfer medium supply portion that supplies the heat transfer medium.

7. The heat exchange system according to claim 1, wherein the heat exchange by the heat exchanger is an exchange of sensible heat.

8. The heat exchange system according to claim 1, further comprising a reactor that is connected to the gas phase space and in which the heat transfer medium in the gas phase is adsorbed or desorbed.

9. A heat storage system comprising:
the heat exchange system according to claim 1; and
a heat accumulator that is connected to the gas phase space, reacts the heat transfer medium in the gas phase with a heat accumulation material, and stores heat.

* * * * *